(12) United States Patent
Zirwas et al.

(10) Patent No.: US 9,544,913 B2
(45) Date of Patent: Jan. 10, 2017

(54) CONTROLLING SCHEDULING DECISIONS IN A DISTRIBUTED COOPERATION SYSTEM

(75) Inventors: Wolfgang Zirwas, München (DE); Lars Thiele, Berlin (DE); Thomas Wirth, Berlin (DE); Thomas Haustein, Potsdam (DE)

(73) Assignee: Fraunhofer Gesellschaft Zur Forderung Der Angewandten Forschung E.V., Munich (DE)

( * ) Notice: Subject to any disclaimer, the term of this patent is extended or adjusted under 35 U.S.C. 154(b) by 233 days.

(21) Appl. No.: 13/391,919

(22) PCT Filed: Aug. 24, 2009

(86) PCT No.: PCT/EP2009/060863
§ 371 (c)(1),
(2), (4) Date: Feb. 23, 2012

(87) PCT Pub. No.: WO2011/023217
PCT Pub. Date: Mar. 3, 2011

(65) Prior Publication Data
US 2012/0155366 A1    Jun. 21, 2012

(51) Int. Cl.
| | | |
|---|---|---|
| *H04W 72/04* | (2009.01) | |
| *H04W 72/12* | (2009.01) | |
| *H04B 7/02* | (2006.01) | |
| *H04B 7/04* | (2006.01) | |
| *H04W 92/20* | (2009.01) | |

(52) U.S. Cl.
CPC ......... *H04W 72/1278* (2013.01); *H04B 7/024* (2013.01); *H04B 7/022* (2013.01); *H04B 7/0413* (2013.01); *H04W 92/20* (2013.01)

(58) Field of Classification Search
CPC .... H04W 72/12; H04W 72/04; H04W 72/046; H04B 7/04; H04L 5/0037
See application file for complete search history.

(56) References Cited

U.S. PATENT DOCUMENTS

| | | | |
|---|---|---|---|
| 2007/0155388 A1* | 7/2007 | Petrovic et al. | 455/442 |
| 2008/0014946 A1* | 1/2008 | Kubota | 455/436 |
| 2009/0036129 A1* | 2/2009 | Harada et al. | 455/436 |
| 2009/0067529 A1 | 3/2009 | Mielczarek et al. | 375/267 |
| 2011/0063989 A1* | 3/2011 | Yang et al. | 370/252 |

OTHER PUBLICATIONS

Jungnickel, V. et al., "Implementation Concepts for Distributed Cooperative Transmission", © 2008 IEEE, 5 pgs.

(Continued)

*Primary Examiner* — Anez Ebrahim
(74) *Attorney, Agent, or Firm* — Harrington & Smith

(57) ABSTRACT

Feedback information is received from user equipments served by jointly processed data streams of a coordinated multipoint transmission at each base station of base stations serving the jointly processed data streams, and scheduling data is decided for the user equipments based on the feedback information and scheduling rules. The scheduling rules may be determined at least in part by one of the base stations and scheduling decisions by the base stations may be synchronized. Scheduling decisions may be transferred via a backhaul link and/or over the air, which may include scheduling decisions for future transmission time intervals.

14 Claims, 4 Drawing Sheets

(56) References Cited

OTHER PUBLICATIONS

3GPP TR36.814 V0.4.1 (Feb. 2009), "3$^{rd}$ Generation Partnership Project; Technical Specification Group Radio Access Network; Further Advancements for E-UTRA Physical Layer Aspects (Release 9)", 31 pgs.
R1-092310, 3GPP TSG-RAN WG1 #57bis, Los Angeles, CA, USA, Jun. 29-Jul. 3, 2009, "Comparison of CSI Feedback Schemes", Alcatel-Lucent, 11 pgs.
R1-092439, 3GPP TSG RAN WG1 #57bis Meeting, Los Angeles, USA, Jun. 29-Jul. 3, 2009, "Discussion on over-the-air communication for CoMP", Mitubishi Electric, 2 pgs.

\* cited by examiner

US 9,544,913 B2

CONTROLLING SCHEDULING DECISIONS IN A DISTRIBUTED COOPERATION SYSTEM

TECHNICAL FIELD

The present invention relates to controlling scheduling decisions in a distributed cooperation system.

BACKGROUND

Currently for LTE (Long Term Evolution) Advanced communication systems so called Coordinated Multi Point (CoMP) transmission is investigated with the goal to overcome inter cell interference limitations.

SUMMARY

High performance gains can be expected from so called joint precoding solutions, where precoded data are transmitted from several eNBs (evolved Node Bs) simultaneously to several UEs (User Equipments).

Highest performance would be achieved in case of a full network wide cooperation, but this would require channel estimation from all eNBs to all UEs, feedback of this huge amount of information from the UEs to the eNBs as well as multicasting of user data from all UEs to all eNBs.

In practical systems therefore so called cooperation areas (CA) have to be defined limiting cooperation to a few adjacent cells.

One eNB may then be defined as central unit which performs pre-processing and precoding within the CA and sends precoded Tx (transmitter)-signals to all eNBs of the CA. This solution requires that channel state information (CSI) from all eNBs are being sent to the CU and pre-processed data are sent back from the CU to the eNBs of the CA. If eNBs are allocated at different sites transfer of data has to be done over backhaul links, so called X2 interface, which might exhibit quite some transmission delay. Due to the transmission delay—which easily might have several or even some 10 ms—the precoded data might be outdated with respect to the actual channel conditions leading to severe performance degradations.

As alternative for the CU based joint precoding so called distributed or self organized precoding (DCA) has been developed.

The present invention aims at minimizing feedback outdating in distributed coordinated multi-point transmission systems.

Moreover, the present invention aims at keeping distributed base stations of a distributed cooperation system which serve jointly processed data streams of a coordinated multi-point transmission synchronized.

According to an embodiment of the invention, feedback information is received from user equipments served by jointly processed data streams of a coordinated multi-point transmission at each base station of base stations serving the jointly processed data streams, and scheduling data is decided for the user equipments based on the feedback information and scheduling rules. The scheduling rules may be determined at least in part by one of the base stations and scheduling decisions by the base stations may be synchronized. Scheduling decisions may be transferred via a backhaul link and/or over the air, which may include scheduling decisions for future transmission time intervals.

BRIEF DESCRIPTION OF THE DRAWINGS

In the following embodiments of the invention are described with reference to the accompanying drawings, in which.

DETAILED DESCRIPTION OF THE DRAWINGS

Figure 1:
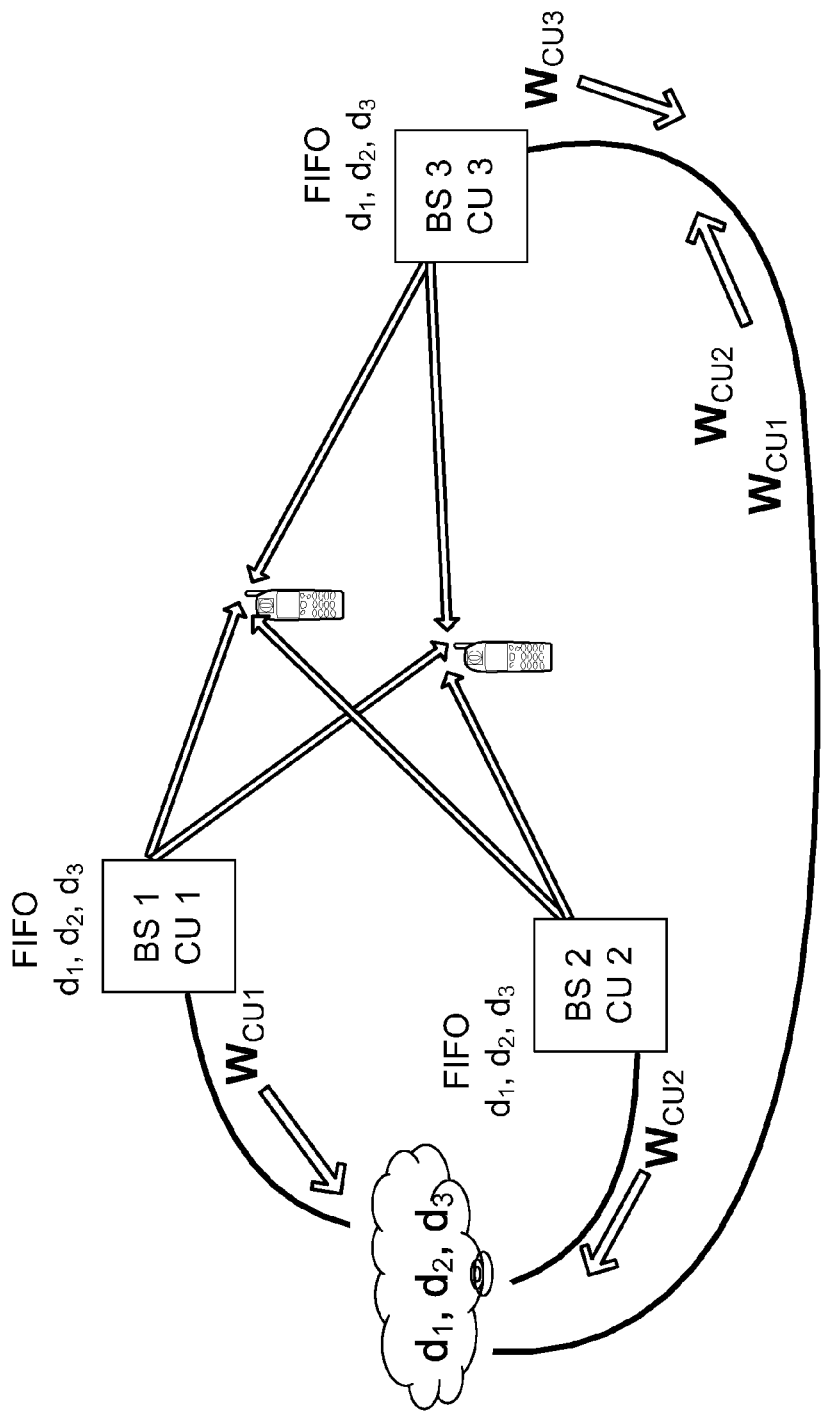
FIG. 1 shows a diagram illustrating a distributed self-organizing cooperation (distributed cooperation area, DCA) scenario.

FIG. 1 illustrates a distributed self-organizing cooperation (DCA) scenario. A central unit (CU) is replaced by independent precoders at each eNB BS1, BS2, BS3 of a cooperation area (CA). In case the individual precoders at each eNB apply exactly the same precoding—as would do a CU—the resulting Tx signals per eNB are exactly the same. To be precise, based on same available user data exactly the same precoding will be calculated by each eNB. For this purpose all eNBs have to have available all user data for cooperating UEs. This can be done by multi casting solutions, e.g. known from IP (Internet Protocol) multicasting. For proper precoding all eNBs have to know CSI data of all UEs. This can be achieved by a unicast transmission of CSI data from a specific UE to its serving (dedicated) eNB. Collaborating eNBs have to exchange CSI data feedback reported by their UEs. And therefore, a backhaul link with low delays is required. Alternatively, multicasting of CSI data over the air from all UEs to all eNBs is performed, i.e. an improved UL (UpLink) feedback link is required.

The advantage of the multicasting solution is that it saves the CSI data transmission over the backhaul link, which avoids corresponding backhaul delays. Thus, CSI data outdating can be minimized.

Synchronization of distributed schedulers leads to some inherent challenges if fast adaptation to time varying channel conditions should be achieved to exploit multi user scheduling gains.

In other words, one of the main challenges of distributed cooperation systems like DCA is to keep synchronization between the eNBs as otherwise performance will degrade significantly.

Here it is assumed that time (here meaning transmission timing) and frequency synchronization is given by according measures like e.g. GPS (Global Positioning System).

Time synchronization of multicasted data packets is assumed to be perfect as well based on continuously included time stamps into multicasted data streams of the UEs so that each eNB of the CA has all required UE data $d_1$, $d_2$, $d_3$ for all UEs available in its FIFO (First-In-First-Out) buffers.

The difficult part regarding synchronization in case of distributed CAs is coordination/synchronization of independent schedulers CU1, CU2, CU3—i.e. MAC (Medium Access Control) entities—at the cooperating eNBs BS1, BS2, BS3. This includes selection of UEs for COOPA (cooperative antenna), decision about PRBs (Physical Resource Blocks) on which the COOPA UEs should cooperate, a corresponding rank, MIMO (Multi-Input-Multi-Output) mode, precoder and MCSs (modulation and coding schemes) per UE and handling of HARQ (Hybrid Automatic repeat request) retransmissions.

In case of a central unit, the central unit does the decisions for all eNBs simultaneously. However, in a distributed CA there is no single CU in order to avoid delays over the X2 interface for feeding back CSI data from all eNBs to the CU as well as for transmitting precoded data back to all eNBs.

For DCAs as shown in FIG. 1 typically the UEs broadcast their CSI data estimates to all cooperating eNBs BS1, BS2, BS3 so that all distributed cooperation Tx points have the same overall channel information available. In a practical system there will be a certain block error rate (BLER) target given by outer loop link adaptation (OLLA) for UL reports carrying the CSI data so that there will be a regular mismatch of received CSI data at the eNBs. In that case precoding and scheduling at the eNBs might easily diverge, possibly leading to severe precoding performance degradations. BLER targets for CSI reports might be set to lower values, but that leads to higher overhead due to larger code redundancy. HARQ retransmissions to resolve failed reports are expected to be too time consuming, so lost packets are just skipped similarly as for UDP (User Datagram Protocol) data traffic.

A further issue is that eNBs will carry CoMP UEs as well as single cell UEs, e.g. for voice users. If eNBs are making allocations of PRBs for certain single cell users independently, PRBs for CoMP might be blocked already by single cell UEs at a certain eNB, leading to a detrimental simultaneous transmission of CoMP UEs and conventional UEs at one PRB.

In case of user centric cooperation areas, UEs of one cell might cooperate depending on the according path losses with different eNBs. In that case the different cooperation areas might by chance allocate same resources—i.e. PRBs—within that cell, mutually blocking each other. This issue has to be resolved as well. As each cell might be interlinked to several CAs, the issue might escalate so that all eNBs have to use one single network wide scheduler to overcome the issue.

Thus, the problem to solve is a full coordination/synchronization of schedulers in DCA systems.

In the case of self organized distributed CAs scheduling decisions $W_{CU1}$, $W_{CU2}$, $W_{CU3}$ of the schedulers CU1, CU2, CU3 may be transferred over the air over eNB-UE-cooperating eNB links, as indicated in FIG. 1. The over the air signalling has the advantage that it is not dependent on the backbone (backhaul) link and might be therefore faster and independent on any X2 latencies. At the same time it increases the DL (DownLink) and UL data traffic load and in addition is quite sensitive to transmission errors. Probably the amount of feedback required for scheduling decisions can be lower than that for CSI feedback allowing for higher coding gains and smaller BLER targets.

Handshake protocols might be used to assure proper acceptance of scheduler decisions at all eNBs, but this definitely leads to an even larger overall delay as there will be several X2 delays between CSI estimation and transmission of precoded Tx signals.

One option to solve the above-mentioned problems is to fix scheduling and maybe even precoding decisions for longer times, e.g. define a certain sub-band or number of PRBs as being used for CoMP UEs and another sub-band for single cell UEs. In addition, the UE numbers might be fixed to certain PRBs. This allows for robust solutions, but does not adequately adapt to varying load and channel conditions so that scheduling gains will be lost.

The present invention proposes two concepts, a first concept using a central unit (CU) for decision making, and a second concept of defining restricted decision rules forcing all distributed schedulers to the same scheduling and precoding decisions.

Figure 2:
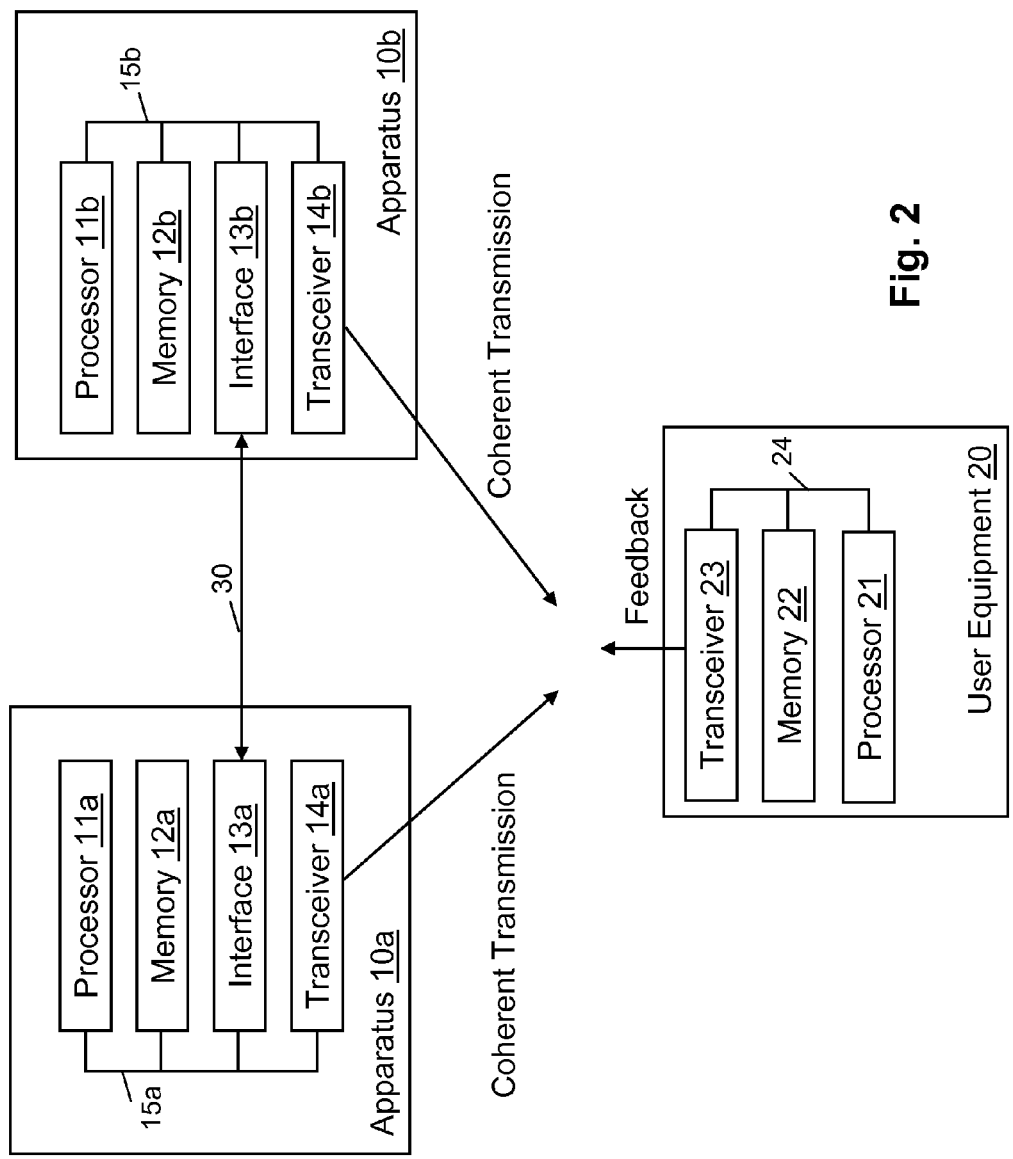
FIG. 2 shows a schematic block diagram illustrating structures of apparatuses and a user equipment according to an embodiment of the invention.

Before describing the concepts, structures of apparatuses and a user equipment according to an embodiment of the invention are described with respect to FIG. 2.

FIG. 2 shows apparatuses 10a, 10b and a user equipment 20. The apparatuses 10a, 10b may comprise base stations such as eNBs. The apparatuses 10a, 10b are considered to serve jointly processed data streams of a CoMP transmission, and may also serve single cell UEs. In other words, the apparatuses 10a, 10b are collaborating base stations in a collaboration area of a CoMP system. The user equipment 20 is considered to be served by the apparatuses 10a, 10b.

As shown in FIG. 2, the apparatus 10a comprises a processor 11a, a memory 12a, an interface 13a and a transceiver 14a, which are linked by a bus 15a. The transceiver 14a is coupled to one or more antennas (not shown) for bidirectional wireless communications over one or more wireless data streams with the user equipment 20. The apparatus 10b comprises a processor 11b, a memory 12b, an interface 13b and a transceiver 14b, which are linked by a bus 15b. The transceiver 14b is coupled to one or more antennas (not shown) for bidirectional wireless communications over one or more wireless data streams with the user equipment 20. Moreover, apparatuses 10a, 10b may communicate with each other over the air using transceivers 14a, 14b. Such communications may be performed via the user equipment 20.

The user equipment 20 comprises a processor 21, a memory 22 and a transceiver 23, which are linked by a bus 24. The transceiver 23 is coupled to one or more antennas (not shown) for bidirectional wireless communications over one or more wireless data streams with the apparatuses 10a, 10b.

Inherent in the processors 11a, 11b and 21 is a clock to enable synchronism among the various apparatus for transmissions and receptions within the appropriate time intervals and slots required, as the scheduling grants and the granted resources/sub-frames are time dependent. The transceivers 14a, 14b, 23 include both transmitter and receiver, and inherent in each is a modulator/demodulator commonly known as a modem. The interfaces 13a, 13b also are assumed to each include a modem to facilitate communication over a (hardwire) link 30 between apparatus 10a and apparatus 10b.

The exemplary embodiments of this invention may be implemented by computer software stored in the memories 12a, 12b, 22 and executable by the corresponding processor, or by hardware, or by a combination of software and/or firmware and hardware in any or all of the apparatuses and user equipment shown in FIG. 2.

In general, the various embodiments of the user equipment 20 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 12a, 12b, 22 may be of any type suitable to the local technical environment and may be implemented using any suitable data storage technology, such as semiconductor-based memory devices, magnetic memory devices and systems, optical memory devices and systems, fixed memory and removable memory. The processors 11a, 11b, 21 may be of any type suitable to the local technical environment, and may include one or more of general purpose computers, special purpose computers, microprocessors, digital signal processors (DSPs) and processors based on a multi-core processor architecture, as non-limiting examples.

The apparatuses 10a, 10b and the user equipment 20 belong to a collaboration area of a CoMP system. The apparatuses 10a, 10b provide coherent transmission to the user equipment 20, and the user equipment 20 provides feedback to the apparatuses 10a, 10b. This feedback may comprise channel state information which is obtained, e.g. determined, by the processor 21 for the apparatuses 10a, 10b. The channel state information may be obtained for each transmitter antenna Tx of the transceivers 14a, 14b, i.e. for each channel on which signals are received from the apparatuses 10a, 10b.

In the following a first concept of the invention is described by way of embodiments thereof. A network centric CA is assumed, so that overlapping decisions on certain PRBs can be avoided. Moreover, it is assumed that each eNB of a CA receives same estimated CSI data, some form of CQI (Channel Quality Information) and rank information (RI) for each UE.

Figure 3:
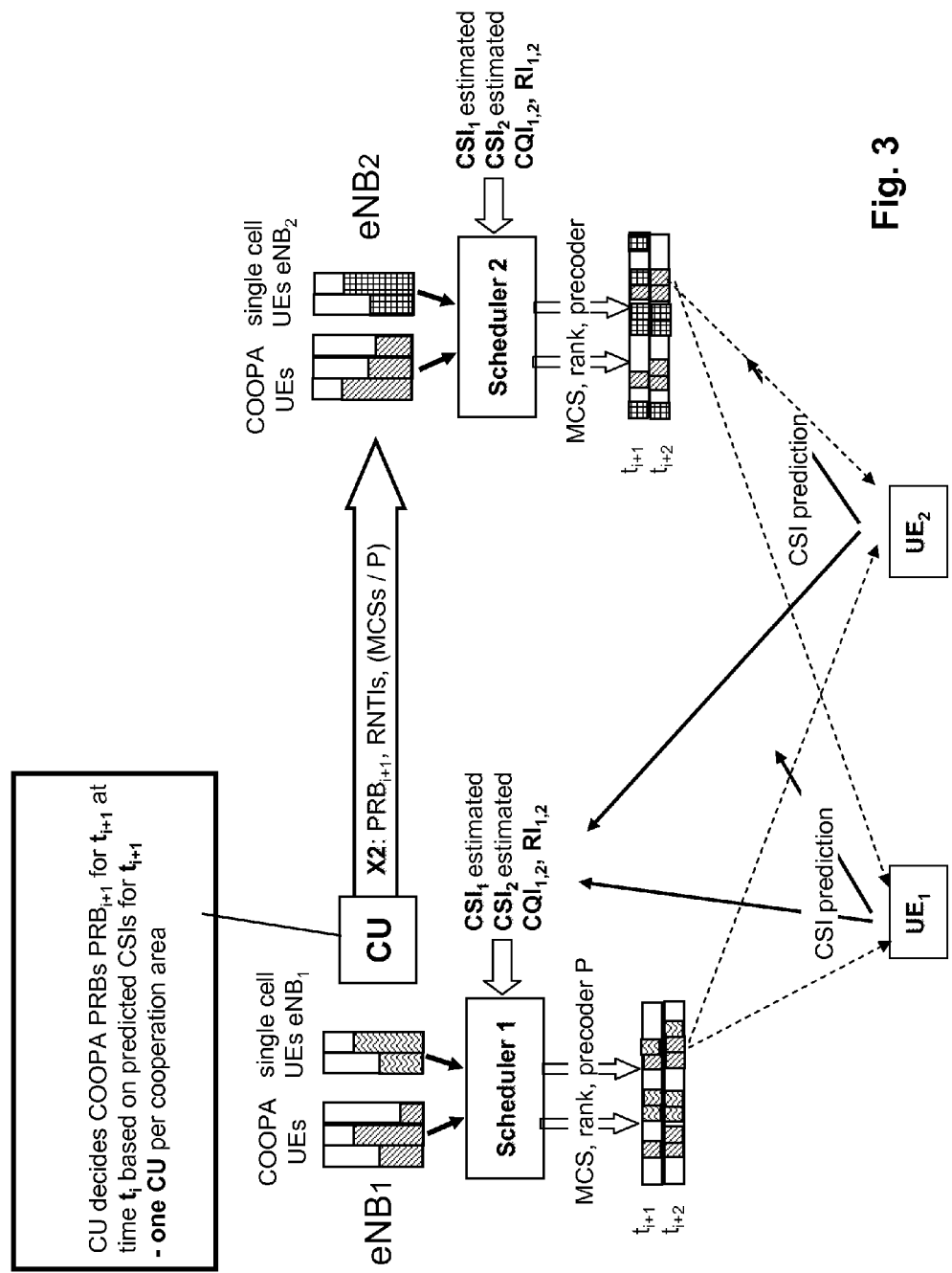
FIG. 3 shows a diagram illustrating signalling between base stations and user equipments in a network centric defined cooperation area with one central unit according to an embodiment of the invention.

FIG. 3 shows a network centric defined cooperation area CA with one central unit CU which makes decisions for the whole CA, like which UEs should cooperate using radio network temporary identifiers (RNTIs) on which PRBs, i.e. the CU selects COOPA UEs and the PRBs on which the COOPA UEs should cooperate. Moreover, the CU decides which precoder P should be used and which MCSs have to be used per UE. The decisions of the CU are sent to the other cells/eNBs over the X2 interface connecting the eNBs. FIG. 3 shows two eNBs eNB1 and eNB2, where eNB1 acts as CU.

Referring to FIG. 2, it is assumed that apparatus 10a acts as CU (i.e. eNB1 of FIG. 3), and apparatus 10b acts as eNB2 of FIG. 3. Then the processor 11a, which may act as scheduler 1 of eNB1 shown in FIG. 3, decides scheduling data for jointly processed data streams of a coordinated multi-point transmission (illustrated by the arrows in broken lines in FIG. 3), based on feedback information received from user equipments UE1 and UE2 (shown in FIG. 3) which are served by the jointly processed data streams. The interface 13a indicates the scheduling data to base stations serving the jointly processed data streams, i.e. apparatus 10b of FIG. 2 or eNB2 of FIG. 3, via a backhaul link, i.e. link 30 or X2 interface.

The interface 13b receives the scheduling data via the backhaul link, and the processor 11b, which may act as scheduler 2 of eNB2 shown in FIG. 3, controls jointly processed data streams of the coordinated multi-point transmission, which are served by the apparatus 10b, based on the scheduling data. Similarly, the processor 11a, which may act as scheduler 1, controls jointly processed data streams of the coordinated multi-point transmission, which are served by the apparatus 10a, based on the scheduling data.

With this solution, however, scheduling decisions will be delayed by the X2 interface. Note, still the delay for transmitting CSI data from all cells/eNBs to the CU is avoided.

A mixture of CoMP UEs and single cell UEs has to be served by all eNBs and CoMP UEs have to use same resources at all eNBs so that CoMP resources are blocked for single cell UEs. The eNBs have to wait for the X2 delayed CU decisions, before they are allowed to schedule their own single cell UEs. This waiting would potentially reduce opportunistic scheduling gains of single cell UEs, which has to be avoided. As a countermeasure scheduling decisions (scheduling data) are sent not for the current TTI (Transmission Time Interval) $t_i$ but for the next or even more future TTI $t_{i+1}$. In that case all eNBs receive CoMP allocation well in time before the next TTI so that single cell UEs can be scheduled at residual PRBs. To avoid that CSI outdating degrades precoding performance significantly, according to an embodiment it is proposed that UEs do not feed back actual CSI data for time $t_i$ but predicted CSI data for the time $t_{i+1}$. Alternatively or in addition, the eNBs perform prediction of CSI data for the time $t_{i+1}$ based on unpredicted CSI feedback from the UEs. Simulations have shown that for low mobility of 3 kmh even simple linear prediction for 5-10 ms works very well.

Referring to FIG. 2, the processor 11a decides the scheduling data for a transmission time interval $t_{i+1}$ after a current transmission time interval $t_i$ based on the feedback information predicted for the transmission time interval $t_{i+1}$. In other words, the CU (e.g. the scheduler 1 of eNB1) decides COOPA PRBs $PRB_{i+1}$ for $t_{i+1}$ at time $t_i$ based on predicted CSI data for $t_{i+1}$ as depicted in FIG. 3. Single cell UEs are scheduled by eNB1 and eNB2 individually on the remaining PRBs on TTI basis.

The user equipment 20 shown in FIG. 2 may act as UE1 and/or UE2 shown in FIG. 3. According to an embodiment, the processor 21 predicts feedback information for the jointly processed data streams of the coordinated multi-point transmission, by which the user equipment 20 is served, for a transmission time interval $t_{i+1}$ after a current transmission time interval $t_i$, and the transceiver 22 transmits the feedback information (transmission of CSI prediction shown as arrows in continuous lines in FIG. 3) to eNB1 and eNB2 serving the jointly processed data streams. The UE1 and the UE2 respectively transmit feedback information $CSI_{1\ estimated}$, $CSI_{2\ estimated}$, $CQI_{1,2}$ and $RI_{1,2}$ for eNB1 and eNB2.

The processor 21 may also determine feedback information for the current time interval, and the transceiver 22 may transmit the feedback information to eNB1 and eNB2.

The feedback information (i.e. the predicted feedback information for the next TTI and the determined feedback information for the current TTI) may comprises at least one of the following: channel state information (CSI), channel quality information (CQI) and rank information (RI).

This solution is very suitable for low to moderate X2 delays—optimally in the order of 1 to few ms—so that prediction time can be kept moderately small. Precoders may be partly updated at eNBs in case predicted CSI data deviates significantly from currently reported one.

According to a second concept of the invention, restricted scheduling rules (RSR) are defined, which can be derived by each eNB independently based on its available CSI feedback from all UEs participating in the cooperation. The rules ensure identical scheduling and precoding decisions or at least decisions leading to only minor performance degradations.

Due to possible transmission errors with some small error probability one or the other feedback report might be missing at eNBs. In the second concept different options are investigated how it can be assured that in case of single failures of feedback reports there will be still a coarse CSI knowledge available (a solution would be to fall back to previous CSI reports). In that case precoding with coarser CSI data will not provide full precoding gains, but do not fail completely. In that sense robust solutions are possible.

In the following the second concept is described by way of embodiments thereof.

In case of restricted scheduling rules (RSR) the freedom of schedulers is limited to some extend to assure that all schedulers at all cooperating eNBs will come to the same decision.

For RSR the CU together with the X2 interface shown in FIG. 3 may be omitted completely or at least does not distribute its scheduling decisions over the X2 interface to other eNBs. Instead, each eNB uses the received CSI reports to select PRBs as well as precoders and MCSs exactly according to some very stringent and consistent rules, assuring that all eNBs will finally find the same scheduling decisions independently from each other.

Figure 4:
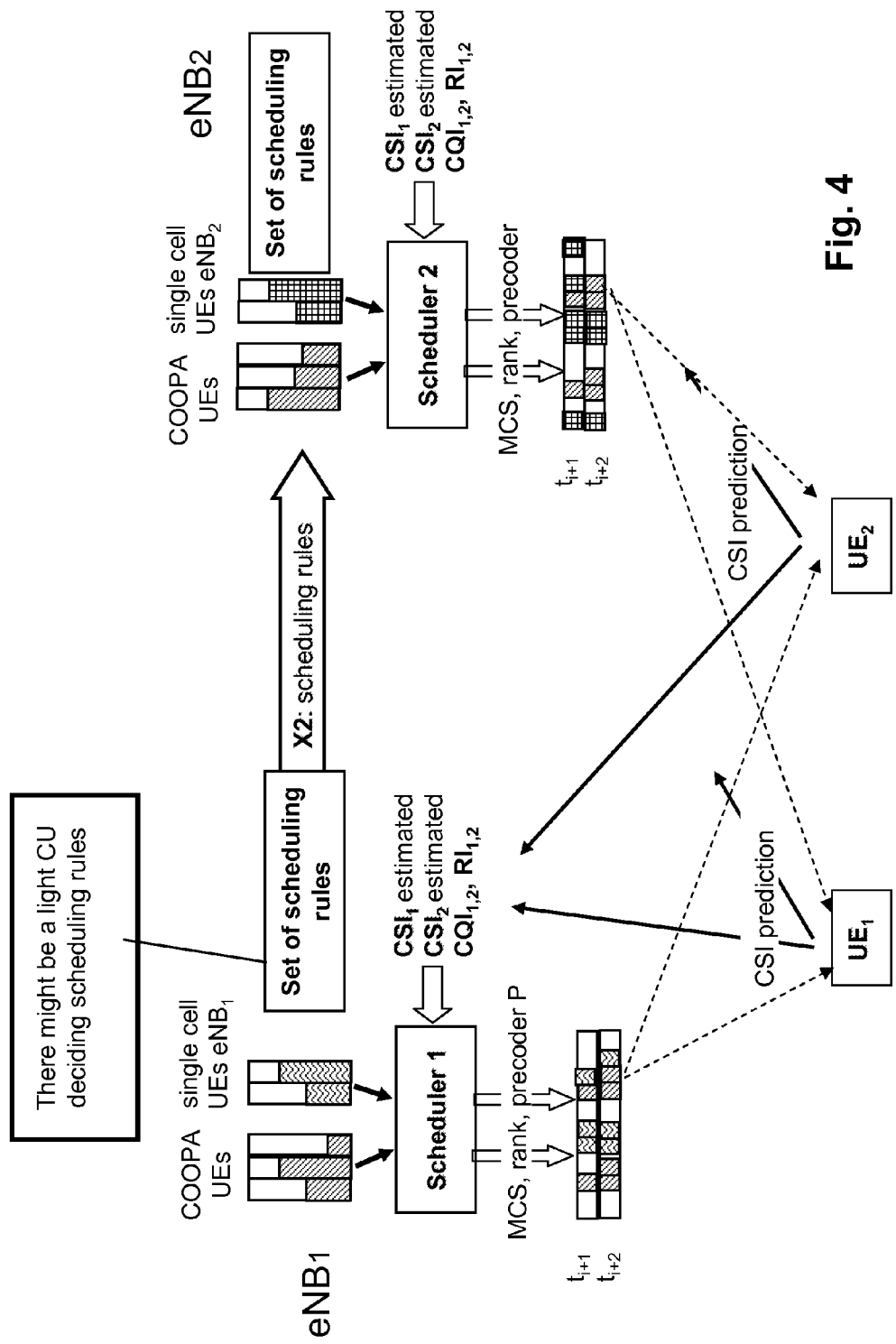
FIG. 4 shows a diagram illustrating signalling between base stations and user equipments according to a distributed concept using restricted scheduling rules according to an embodiment of the invention.

FIG. 4 shows a distributed concept based on RSR, allowing for independent scheduling entities. FIG. 4 is similar to FIG. 3 except that there is no CU making scheduling decisions for all cooperating eNBs. For the description of the similar parts of FIGS. 3 and 4 it is referred to the description of FIG. 3.

Referring to FIG. 2, apparatuses 10a, 10b may act as eNBs according to the second concept. The transceiver 14a, 14b receives feedback information (CSI reports) from user equipments (e.g. user equipment 20) served by jointly processed data streams of a coordinated multi-point transmission, and the processor 11a, 11b which may act as scheduler 1, scheduler 2 shown in FIG. 4, decides scheduling data for the user equipments based on the feedback information and scheduling rules.

The scheduling data may comprise at least one of the following: physical resource blocks to be used for the user equipments, radio network temporary identifiers for the user equipments, a precoder to be used for each of the user equipments, and a modulation and coding scheme to be used for each of the user equipments.

As some of the CSI reports may have been failed at some of the eNBs the RSR have to be in addition very robust against errors or at least should lead to a fallback mode with only minor performance degradations. The assumption is that there is a coarse and a fine quantized CSI data being reported by the UEs. Without going into details it is assumed that the coarse CSI data (e.g. the 2 MSBs (Most Significant Bits) per channel component) is always available at all eNBs, even if some of the reports have been missed. Thus, important decisions like selection of PRBs may be done based on coarse instead of fine CSI data avoiding mismatch due to missed fine CSI reports. For precoding coarse or fine CSI data may be used depending on how much CSI data is available. That guarantees that the system does not fail and benefits as much as possible of the available CSI data.

Before any scheduling can be done a full processing chain has to be defined and implemented exactly the same for all eNBs. This includes specifically how CSI data has to be handled, e.g. how to interpolate etc., but also OFDM (Orthogonal Frequency Division Multiplexing) receiver processing and queue handling.

Scheduling rules are described below.

Typically schedulers at eNBs are free to select different PRBs for a UE as long as the performance is similar. For RSR it has to be assured that all eNBs allocate PRBs by the same rule, e.g. start filling PRBs with lowest number.

The schedulers have to apply same QoS (Quality of Service) criteria and priority scheme. It is to be noted that FIFO fill levels may be not a good criterion as these may be different for different eNBs due to different access links.

There should be a rule for selection of MCSs given a CQI feedback. Specifically in case some eNBs have received only coarse CSI data, MCS selection has to be robust, e.g. by keeping MCSs for at least x sub-frames. Within this time all eNBs may have gained full CSI data and can make same decisions.

Same power normalization has be to applied at the eNBs as well as same precoder calculation for selected PRBs. It is to be noted that precoding will be typically vendor specific. Here for DCAs there should be at least a default precoder.

Scheduling rules may be predefined and standardized. In that case all eNBs have to follow these rules always. A more flexible solution is to define an interface, where specific scheduling rules are defined by a CU and distributed to all eNBs. This is more flexible and allows for vendor specific scheduling rules. Only default scheduling may be standardized, but more enhanced schemes may be implementation specific. This has the additional advantage that testing can be simplified.

As shown in FIG. 4, eNB1 and eNB2 each include a set of scheduling rules for making own scheduling decisions. The eNB1 may act as a light CU deciding specific scheduling rules which are sent to eNB2 over the X2 interface according to an embodiment of the invention. Alternatively or in addition, the specific scheduling rules may be transmitted over the air to eNB2.

Referring to FIG. 2, apparatus 10a may act as light CU eNB1, and apparatus 10b may act as eNB2. Then the processor 11a, which may act as scheduler 1, determines specific scheduling rules and the interface 13a transmits the specific scheduling rules to the apparatus 10b via the link 30 (backhaul link, e.g. X2 interface) and/or the transceiver 14a transmits the specific scheduling rules to the apparatus 10b over the air. In turn, the interface 13b receives the specific scheduling rules via the link 30 and/or the transceiver 14b receives the specific scheduling rules over the air.

Even so robust definition of scheduling rules may generally assure good scheduler synchronization, in specific situations RSRs may come to their limits, e.g. if feedback reports are missed in unexpectedly fast varying channel conditions. Therefore it is important to detect scheduler mismatches as fast as possible to avoid long periods of degraded transmission. As mentioned before typically handshake protocols are too slow and add too much extra delay. At the same time here it is proposed to send main decisions over the backbone from each eNB to a so called light CU, which collects all decisions to control synchronicity. As soon as the light CU detects a mismatch it may start certain counter measures as described below.

The light CU may adapt its own decisions to that of the other eNBs, which causes no further delay.

Alternatively or in addition, the light CU may send a full SYNC report—containing UE ID, MCS, PRB, etc. for a certain TTI—so that the other eNBs can continue from this synced state. In another embodiment, the SYNC report may be also multicasted regularly by the light CU.

Referring to FIG. 4, eNB1 acts as light CU, and eNB2 receives SYNC reports from eNB1. Referring to FIG. 2, assuming that apparatus 10a acts as eNB1 and apparatus 10b acts as eNB2, the processor 11a decides synchronized scheduling data (SYNC report) for the jointly processed data streams for a certain transmission time interval based on feedback information received from user equipments served by the jointly processed data streams (i.e. user equipment 20 of FIG. 2 or UE1, UE2 of FIG. 4), and the interface 13a indicates the synchronized scheduling data to the base stations (apparatus 10b, eNB2) via the link 30 (e.g. X2 interface). Alternatively or in addition, the transceiver 14a indicates the synchronized scheduling data to the base stations over the air.

In turn, the interface 13b/transceiver 14b may receive the synchronized scheduling data, and the processor 11b may adapt the scheduling data of apparatus 10b for the certain transmission time interval to the synchronized scheduling data. Similarly, the processor 11a may adapt the scheduling data of apparatus 10a for the certain transmission time interval to the synchronized scheduling data.

According to an embodiment of the invention, the processor 11a decides the synchronized scheduling data and causes the interface 13a/transceiver 14a to transmit the synchronized scheduling data at regular time intervals.

According to another embodiment, the interface 13b/transceiver 14b may transmit at least part of the scheduling data decided by the apparatus 10b to the apparatus 10a via the link 30/over the air. The interface 13a/transceiver 14a may receive the scheduling data decided by the apparatus 10a. In case the processor 11a detects a mismatch of scheduling decisions at the apparatus 10b based on the scheduling data received from the apparatus 10b, the processor 11a decides the synchronized scheduling data and the interface 13a/transceiver 14a indicates the synchronized scheduling data to the apparatus 10b via the link 30/over the air.

According to another embodiment of checking synchronicity, all eNBs report regularly some predefined samples from their Tx signals. These Tx signals will be appropriate ones only in case the full scheduling and processing chain is working properly and fully synced. The advantage of this scheme is that reporting overhead will be typically small.

In other words, referring to FIGS. 2 and 4, the interface 13b/transceiver 14b of apparatus 10b which is assumed to act as eNB2 transmits predefined samples of signals transmitted by the apparatus 10b on data streams of the jointly processed data streams, to the apparatus 10a acting as eNB1 via the link 30/over the air.

In turn, the interface 13a/transceiver 14a receives the predefined samples from the apparatus 10b via the link 30/over the air. In case the processor 11a detects a mismatch of scheduling decisions at the apparatus 10b based on the predefined samples of signals, the processor 11a decides the synchronized scheduling data and the interface 13a/transceiver 14a indicates the synchronized scheduling data to the apparatus 10b via the link 30/over the air.

In case of user centric cooperation areas, different cooperation areas overlap at one eNB so the scheduling decisions of each CA may be mutually blocking, i.e. two or more CAs try to allocate same PRBs. This situation requires further restrictions, in case single network wide scheduling should be avoided.

Referring to FIG. 2 it is assumed that apparatus 10a belongs to a first cooperation area (first CA) and apparatus 10b belongs to a second cooperation area (second CA), and the apparatuses 10a and 10b serve jointly processed data streams of a coordinated multi-point transmission for the user equipment 20. Then the processor 11a decides the scheduling data further based on the first cooperation area to which the apparatus 10a belongs, and the processor 11b decides the scheduling data further based on the second cooperation area to which the apparatus 10b belongs.

For example, different CAs may be restricted to predefined sub-bands so that same allocation of PRBs is always avoided. However, this solution is inflexible e.g. in terms of load variations.

To allow for a slow adaptation of allowed PRBs for each CA several options exist. According to an embodiment, a hierarchy of CAs is defined, e.g. by SON (Self Optimizing Network) mechanisms. Highest CA is allowed first to change PRB allocation, informs all other CAs and changes allocation as soon as it is assured that all other CAs are informed about the new allocation. Second highest CAs allocates left free PRBs and multicasts this information to all lower CAs. This is continued up to last CA. Advantage is that there is an adaptation e.g. to varying load conditions, but the mechanism is probably quite slow.

Referring to FIG. 2 and assuming that apparatus 10a belongs to a first CA and apparatus 10b belongs to a second CA, the apparatuses 10a, 10b serving the user equipment 20 in a coordinated multi-point transmission, wherein the scheduling data comprises physical resource blocks, the processor 11a detects a hierarchy of the first and second cooperation areas and allocates the physical resource blocks based on a rank of the first cooperation area of the apparatus 10a in the hierarchy. It is assumed that the first CA is the highest CA so the processor 11a actually allocates the physical resource blocks, and the interface 13a/transceiver 14a transmits allocation information on the allocation of the physical resource blocks to the second cooperation area, i.e. the apparatus 10b. The interface 13b/transceiver 14b receives the allocation information and the processor 11b allocates the physical resource blocks based on a rank of the second CA and the allocation information, i.e. allocates left free physical resource blocks.

According to another embodiment, to allow for a slow adaptation of allowed PRBs for each CA, CAs may fix their allocation for a predefined number of TTIs and are allowed to change their allocation e.g. every xth TTI. If it is assured that at one TTI always maximum one CA is changing its allocation, based on the knowledge of current allocation of all other CAs, mutually orthogonal allocations can be guaranteed. Naturally greedy in advance allocations have to be forbidden to allow for sufficient dynamic in the allocation. Advantage is that allocation optimally adapts, even so not on TTI basis, but rather every 10 TTIs. Under the assumption that channel conditions do not change too much during this time, the allocation will be quite well in line with optimum allocation.

Referring to FIG. 2 and assuming that apparatus 10a belongs to a first CA and apparatus 10b belongs to a second CA, the apparatuses 10a, 10b serving the user equipment 20 in a coordinated multi-point transmission, wherein the scheduling data comprises physical resource blocks, the processor 11a applies an allocation of the physical resource blocks based on the first CA for a predefined number of transmission time intervals x, the interface 13a/transceiver 14a receives allocation information of apparatus 10b, and the processor 11a changes the allocation based on the allocation information every xth transmission time interval. Similarly, the processor 11b applies an allocation of the physical resource blocks based on the second CA for a predefined number of transmission time intervals x, the interface 13b receives allocation information of apparatus 10a, and the processor 11b changes the allocation based on the allocation information every $x^{th}$ transmission time interval, where it is assured that at one transmission time interval maximum one apparatus 10a, 10b changes its allocation.

According to an aspect of the invention, an apparatus comprises deciding means for deciding scheduling data for jointly processed data streams of a coordinated multi-point transmission, based on feedback information received from user equipments served by the jointly processed data streams, and indicating means for indicating the scheduling data to base stations serving the jointly processed data streams, via a backhaul link.

The apparatus may comprise the apparatus 10a, the deciding means may comprise the processor 11a, and the indicating means may comprise the interface 13a.

The scheduling data may comprise at least one of the following: physical resource blocks to be used for the jointly processed data streams, radio network temporary identifiers for the user equipments served by the jointly processed data streams, a precoder to be used for each of the user equipments, and a modulation and coding scheme to be used for each of the user equipments.

The deciding means may decide prediction scheduling data for a transmission time interval after a current transmission time interval based on the feedback information predicted for the transmission time interval. The apparatus may comprise predicting means for predicting the prediction feedback information based on the feedback information from the user equipments. Alternatively or in addition, the deciding means may obtain the prediction feedback information from the user equipments. The predicting means may comprise the processor 11a, 11b.

An apparatus which may comprise the apparatus 10b comprises receiving means for receiving the scheduling data via the backhaul link, and controlling means for controlling jointly processed data streams of the coordinated multi-point transmission, which are served by the apparatus, based on the scheduling data.

The receiving means may comprise the transceiver 14b and the controlling means may comprise the processor 11b.

A user equipment which may comprise the user equipment 20 comprises predicting means for predicting feedback information for the jointly processed data streams of the coordinated multi-point transmission, by which the user equipment is served, for a transmission time interval after a current transmission time interval, and transmitting means for transmitting the feedback information to base stations (e.g. the apparatuses 10a, 10b) serving the jointly processed data streams.

The predicting means may comprise the processor 21 and the transmitting means may comprise the transceiver 23.

The user equipment may further comprise determining means for determining feedback information for the current time interval, and the transmitting means may transmit the feedback information to the base stations serving the jointly processed data streams. The determining means may comprise the processor 21.

The feedback information may comprise at least one of the following: channel state information, channel quality information and rank information.

According to another aspect of the invention, an apparatus such as apparatus 10a, 10b comprises first receiving means for receiving feedback information from user equipments served by jointly processed data streams of a coordinated multi-point transmission, and first deciding means for deciding scheduling data for the user equipments based on the feedback information and scheduling rules.

The first receiving means may comprise the transceiver 14a, 14b and the first deciding means may comprise the processor 11a, 11b.

The scheduling data may comprise at least one of the following: physical resource blocks to be used for the user equipments, radio network temporary identifiers for the user equipments, a precoder to be used for each of the user equipments, and a modulation and coding scheme to be used for each of the user equipments.

The apparatus, such as the apparatus 10a, may comprise first determining means for determining at least part of the scheduling rules, and first transmitting means for transmitting the at least part of the scheduling rules to base stations serving jointly processed data streams of a coordinated multi-point transmission via a backhaul link and/or over the air. The first determining means may comprise the processor 11a, and the first transmitting means may comprise the interface 13a and/or the transceiver 14a.

The apparatus, such as the apparatus 10b, may comprise second receiving means for receiving the at least part of the scheduling rules via the backhaul link and/or over the air. The second receiving means may comprise the interface 13b and/or the transceiver 14b.

The apparatus, such as the apparatus 10a, may comprise second deciding means for deciding synchronized scheduling data for the jointly processed data streams for a certain transmission time interval based on feedback information received from user equipments served by the jointly processed data streams, and indicating means for indicating the synchronized scheduling data to the base stations via the backhaul link and/or over the air. The second deciding means may comprise the processor 11a and the indicating means may comprise the interface 13a and/or the transceiver 14a.

The apparatus such as the apparatus 10b may comprise second transmitting means for transmitting at least part of the scheduling data and/or predefined samples of signals transmitted by the apparatus on data streams of the jointly processed data streams, to a base station such as the apparatus 10a which is part of base stations serving the jointly processed data streams, via the backhaul link and/or over the air. The second transmitting means may comprise the interface 13b and/or the transceiver 14b.

The second receiving means may receive the synchronized scheduling data for the jointly processed data streams for a certain transmission time interval via the backhaul link and/or over the air, and the apparatus may comprise adaptation means for adapting the scheduling data for the certain transmission time interval to the synchronized scheduling data. The adaptation means may comprise the processor 11b.

The apparatus such as the apparatus 10a may comprise third receiving means for receiving the at least part of scheduling data decided by the base stations and/or predefined samples of signals transmitted by the base stations on data streams of the jointly processed data streams, from the base stations via the backhaul link and/or over the air, and first detecting means for detecting a mismatch of scheduling decisions at the base stations based on the scheduling data and/or predefined samples of signals, and if the detecting means detects a mismatch, the second deciding means decide the synchronized scheduling data and the indicating means indicate the synchronized scheduling data to the base stations via the backhaul link and/or over the air. The third receiving means may comprise the interface 13a and/or the transceiver 14a and the first detecting means may comprise the processor 11a.

The first deciding means may decide the scheduling data further based on a cooperation area to which the apparatus belongs, wherein each base station of base stations serving the jointly processed data streams belongs to a respective cooperation area of cooperation areas, the apparatus being part of the base stations.

The scheduling data may comprise physical resource blocks, wherein the apparatus such as the apparatus 10a, 10b may comprise second detecting means for detecting a hierarchy of the cooperation areas of the base stations, second determining means for determining allocation of the physical resource blocks based on a rank of the cooperation area of the apparatus in the hierarchy, and third transmitting means for transmitting allocation information on the allocation of the physical resource blocks to the other cooperation areas of the cooperation areas. The second detecting means and second determining means may comprise the processor 11a, 11b, and the third transmitting means may comprise the interface 13a, 13b and/or the transceiver 14a, 14b.

The apparatus may comprise fourth receiving means for receiving the allocation information and allocation means for allocating the physical resource blocks based on the rank and the allocation information. The fourth receiving means may comprise the interface 13a, 13b and/or the transceiver 14a, 14b and the allocation means may comprise the processor 11a, 11b.

Alternatively or in addition, the apparatus may comprise application means for applying an allocation of the physical resource blocks based on the cooperation area for a predefined number of transmission time intervals x, wherein the fourth receiving means receive allocation information, and changing means for changing the allocation based on the allocation information every xth transmission time interval. The application means and the changing means may comprise the processor 11a, 11b.

The following advantages can be achieved by the embodiments described above.

The combination of distributed self-organizing CAs with a CU predefining scheduling decisions to all other eNBs of the CA as shown in FIG. 3 allows for a robust implementation and keeps full scheduler flexibility to all eNBs regarding its single cell UEs. Further improvement of this scheme is a predicted CSI feedback allowing informing other eNBs in advance. For moderate X2 delay this may be the preferred solution as it has maximum commonality with a fully centralized CA.

For larger X2 delays, for cooperative relaying solutions or in other cases were high deployment flexibility is required restricted scheduling rules are proposed as illustrated in FIG. 4, assuring even in case of erroneous CSI feedback links robust cooperation. The main advantage of this scheme is that it is fully decoupled from the performance of the backbone net and specifically the X2 interface. User data are multicasted to the eNBs, so there is no extra delay compared to single cell transmission. In case of RSRs no further exchange of data is required between eNBs so immediate transmission is possible.

Hierarchical CAs or intermittently fixed PRB allocation per CA over some TTI is proposed to allow for user centric cooperation areas in combination with flexible adaptation to varying channel or load conditions.

The various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. An apparatus comprising:
   at least one processor and at least one memory including computer program code,
   wherein the at least one memory and the computer code are configured, with the at least one processor, to cause the apparatus to at least perform the following:
     receiving feedback information from a user equipment served by jointly processed data streams of a coordinated multi-point transmission from the apparatus and a second apparatus; and
     deciding scheduling data for the user equipment based on the feedback information and scheduling rules;
     wherein said coordinated multi-point transmission of jointly processed data streams comprises joint precoding of data and simultaneous transmission of the precoded data from the first and the second apparatus,
     wherein the scheduling rules assure that the apparatus and the second apparatus decide the same scheduling data for the coordinated multi-point transmission when receiving the same feedback information, and
     wherein the scheduling rules assure that the apparatus decides the scheduling data independently of the second apparatus and independently of a central unit.

2. The apparatus of claim 1, wherein the at least one memory and the computer code are further configured, with the at least one processor, to cause the apparatus to at least additionally perform the following:
   receiving at least a part of the scheduling rules via at least one of an interface over a backhaul link, or over the air via a transceiver.

3. The apparatus of claim 1, wherein at least one memory and the computer code are further configured, with the at least one processor, to cause the apparatus to at least additionally perform the following:
   transmitting at least part of the scheduling data to the second apparatus; and
   receiving synchronized scheduling data from the second apparatus in case that the second apparatus detects a mismatch between the transmitted scheduling data and scheduling data decided by the second apparatus.

4. The apparatus of claim 1, wherein the at least one memory and the computer code are further configured, with the at least one processor, to cause the apparatus to at least additionally perform the following:
   determining at least part of the scheduling rules,
   transmitting at least part of the scheduling rules to the second apparatus;
   deciding synchronized scheduling data for the jointly processed data streams for a certain transmission time interval based on feedback information received from a user equipment served by the jointly processed data streams; and
   indicating the synchronized scheduling data to the second apparatus.

5. The apparatus of claim 1, wherein the scheduling data comprises at least one of the following: physical resource blocks to be used for the user equipment, radio network temporary identifier for the user equipment, a precoder to be used for the user equipment, and a modulation and coding scheme to be used for the user equipment.

6. The apparatus of claim 1, wherein the scheduling rules comprise one or more of:
   a rule for allocating physical resource blocks,
   quality and service criteria for data scheduling,
   a priority scheme for data scheduling,
   a rule of selection of modulation and coding schemes,
   a rule for power normalization,
   a rule for precoder selection.

7. The apparatus of claim 1, wherein the at least one memory and the computer code are further configured, with the at least one processor, to cause the apparatus to at least additionally perform the following:
   sending at least some of the scheduling data to a central unit, which performs a consistency check with scheduling data of the second apparatus; and
   receiving a report for synchronization of the scheduling data from the central unit when the consistency check has failed.

8. The apparatus of claim 1, wherein at least one memory and the computer code are further configured, with the at least one processor, to cause the apparatus to at least additionally perform the following:
   receiving scheduling data decided by the second apparatus;
   sending synchronized scheduling data to the second apparatus in case that the apparatus detects a mismatch between the received scheduling data and the scheduling data decided by the apparatus.

9. A method comprising:
   receiving feedback information from a user equipment served by jointly processed data streams of a coordinated multi-point transmission from a first and a second apparatus; and
   deciding scheduling data for the user equipment based on the feedback information and scheduling rules;
   wherein said coordinated multi-point transmission of jointly processed data streams comprises joint precoding of data and simultaneous transmission of the precoded data from the first and the second apparatus,
   wherein the scheduling rules assure that the apparatus and the second apparatus decide the same scheduling data for the coordinated multi-point transmission when receiving the same feedback information, and
   wherein the scheduling rules assure that the apparatus decides the scheduling data independently of the second apparatus and independently of a central unit.

10. The method of claim 9, further comprising:
   receiving at least part of the scheduling rules via at least one of a backhaul link or over the air.

11. The method of claim 9, further comprising:
   transmitting at least part of the scheduling data to the second apparatus; and
   receiving synchronized scheduling data from the second apparatus in case that the second apparatus detects a mismatch between the transmitted scheduling data and scheduling data decided by the second apparatus.

12. The method of claim 9, further comprising:
   determining at least part of the scheduling rules;
   transmitting the at least part of the scheduling rules to one or more apparatuses serving the jointly processed data streams of the coordinated multi-point transmission;
   deciding synchronized scheduling data for the jointly processed data streams for a certain transmission time interval based on feedback information received from the user equipment served by the jointly processed data streams; and
   indicating the synchronized scheduling data to the one or more apparatuses.

13. The method of claim 9, further comprising:
   receiving scheduling data decided by the second apparatus;
   sending synchronized scheduling data to the second apparatus in case that the apparatus detects a mismatch between the received scheduling data and the scheduling data decided by the apparatus.

14. A computer program product embodied on a non-transitory computer-readable medium including a program for a processing device, comprising software code portions for performing the following steps when the program is run on the processing device:
   receiving feedback information from a user equipment served by jointly processed data streams of a coordinated multi-point transmission from a first and a second apparatus; and
   deciding scheduling data for the user equipment based on the feedback information and scheduling rules;
   wherein said coordinated multi-point transmission of jointly processed data streams comprises joint precoding of data and simultaneous transmission of the precoded data from the first and the second apparatus,
   wherein the scheduling rules assure that the apparatus and the second apparatus decide the same scheduling data for the coordinated multi-point transmission when receiving the same feedback information, and
   wherein the scheduling rules assure that the apparatus decides the scheduling data independently of the second apparatus and independently of a central unit.

* * * * *